March 11, 1930.  A. BRODIN  1,749,969
WATER HEATER
Filed Jan. 3, 1928  2 Sheets-Sheet 1
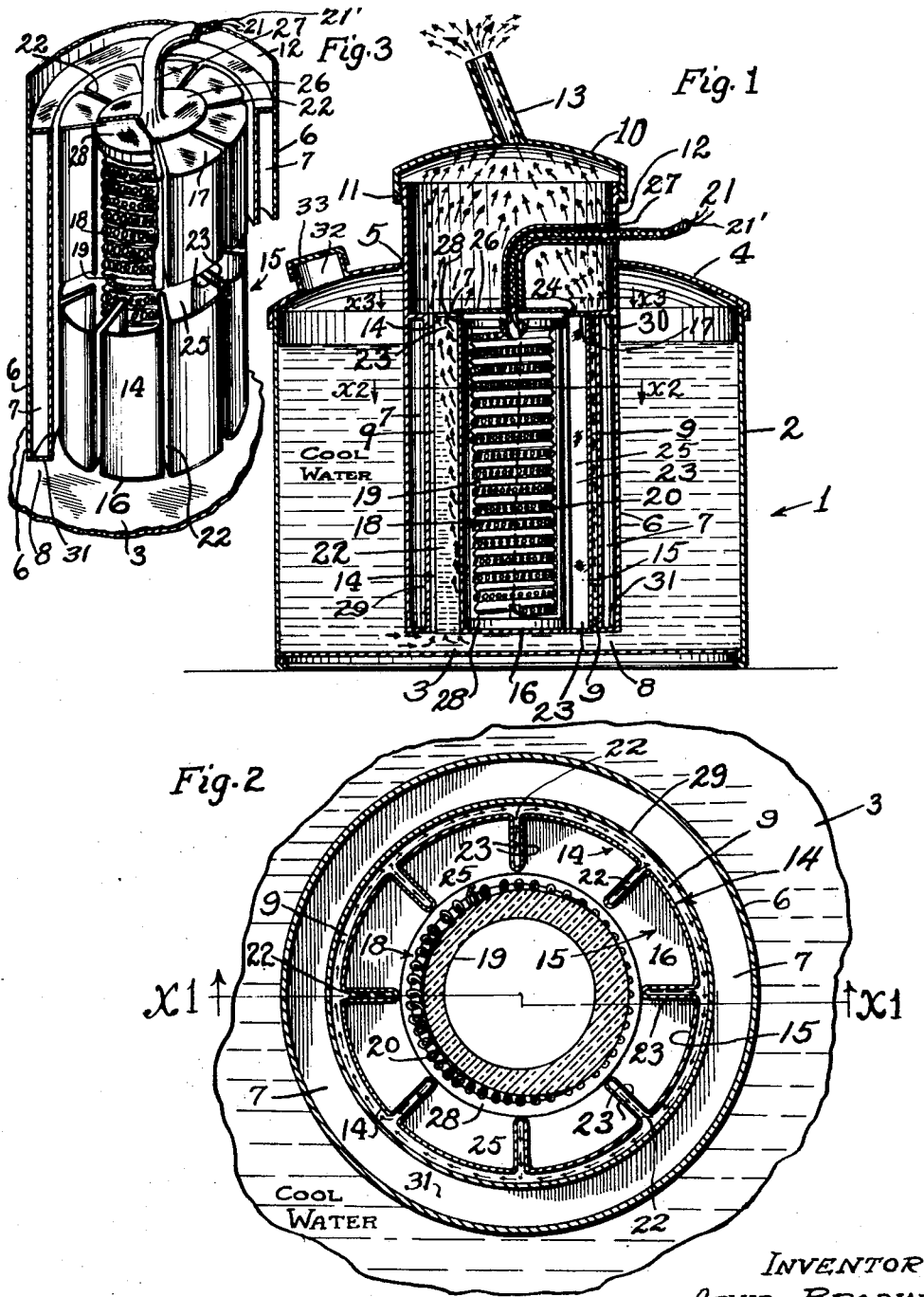
INVENTOR
ARVID BRODIN
WITNESS

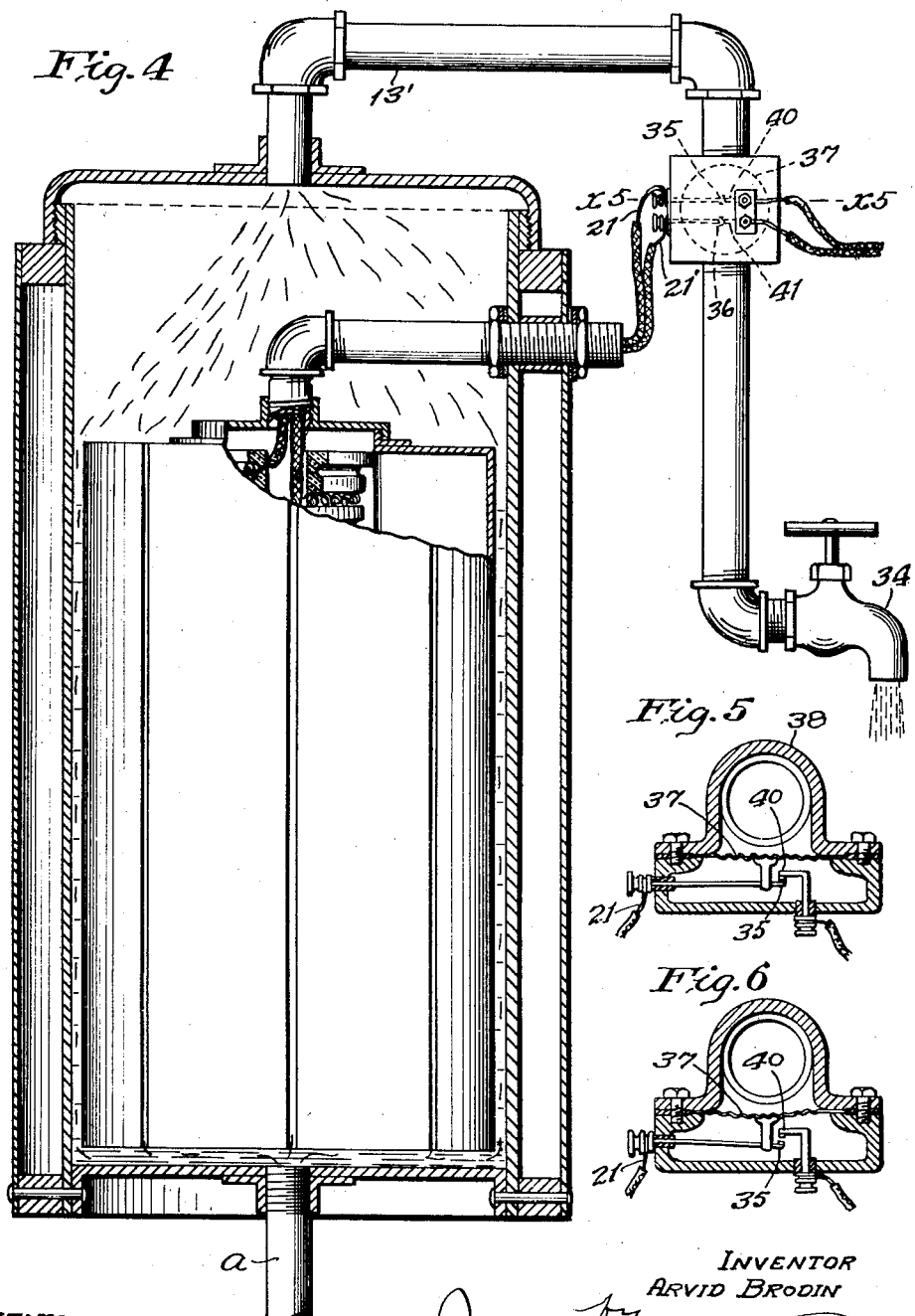

Patented Mar. 11, 1930

1,749,969

UNITED STATES PATENT OFFICE

ARVID BRODIN, OF LOS ANGELES, CALIFORNIA

WATER HEATER

Application filed January 3, 1928. Serial No. 244,107.

An object of this invention is to provide simple, cheap, light, safe and speedy means for heating water to various temperatures and for various purposes as for domestic, industial, medical and surgical use. In one form it is peculiarly adapted for use in steaming cloth, ribbons and other textile or fabric articles preparatory to shaping or pressing the same in millinery and other arts, and preparing materials in the work of making ladies' hats; and in such form it also affords a liquid heater for hospital and therapeutical service.

An object of this invention is to provide a conveniently small water heater, and in one form it produces a portable steam pot by which a required volume of steam may be generated and delivered for the millinery, hospital and therapeutical purposes stated, in minimum time and with minimum expenditure of heating medium.

An object is to provide a portable steam generator for milliners use, the construction of which generator is simple and inexpensive and lends itself readily to multiple production; which in operation, is not likely to cause any soiling of the work or its supporting table, or bench, as by dripping due to condensation of steam at the delivering nozzle or point of discharge.

An object is to provide an economical means for heating water by electrical means.

A feature of the invention is a heating drum constructed to present a maximum exterior surface to the water to be heated or converted into vapor or steam, and a maximum interior surface exposed to radiation from a heating unit.

Another feature in this portable form is the provision of a heat insulating shell or jacket between the water heating chamber and a body of water that affords a continuous supply in a requisitely small volume, of water to be converted into steam in small quantity and at comparatively high temperature and low pressure.

This invention is adapted in one of its forms, to embodiment as an externally cool, convenient steaming accessory.

It is particularly adapted to the convenient vaporization of any liquid free from solid content.

The invention is especially adapted for supplying hot water to a faucet whenever the faucet is opened and the flow turned on.

The invention is broadly new, basic and pioneer in various respects, and particularly in a radiating drum adapted to contain a heating element, as an electrical resistance, and having a thin heat conducting wall that is sinuous and affords narrow vertical slots forming thin and relatively wide, parallel, straight and direct unobstructed channels open from the bottom to the top of the drum to immediately receive water from below the bottom of the drum and to discharge hot water, vapor or steam at the top into a dome above the drum; the walls of such slots being thin sheet metal of high heat conducting quality; said wall being formed of a strip of sheet metal bent into folds, and joined, water tight, at its ends by welding or brazing or otherwise, to heads to form a radiating chamber having a great extent of wall surface and adapted to contain a heating element from which the heat radiates to heat the wall and the water in contact therewith, and adjacent thereto.

Another broadly new, basic and pioneer feature of the invention as a steam pot, resides in the combination with a heating element of a radiating drum, a heater inside the drum, and a bottomless shell around the drum, slightly spaced from the drum to afford a thin water space supplied with liquid from below when the shell with the interior elements is inserted into a body of water; said shell terminating at the top in a steam dome having an outlet for steam.

By this contrivance the shell and the interior elements may be put into a body of water allowing the steam outlet to be open above such body, and the steam produced by the heating element will flow out at the top, and the water will flow in at the open bottom, and but little heat will reach the body of water outside the shell. To prevent transference of heat to the water supplying body, the shell is double walled for insulating purposes.

In the stationary water heater for domestic and industrial use, the water may be led directly from a service pipe into the bottom of the chamber of an outer heat insulating shell that surrounds, and is spaced from a heating drum, and a continuous discharge open pipe through which the heated product may be discharged.

This invention is also broadly new, basic and pioneer in that I provide in combination with the shell, and the drum in and spaced from the shell, wall, a pipe to supply water under pressure to the space between the drum and the shell wall; and a pipe connected to the shell to discharge water therefrom; and control the current to the electric resistance in such drum, by a switch controlled by the pressure in the pipe; and such pressure is controlled by a valved outlet between which and the resistance, the switch is located.

Other objects, advantages and features of invention may appear from the accompanying drawings, the subjoined detailed description and the appended claims.

The accompanying drawings illustrate the invention in two forms of embodiment.

Figure 1 is an elevation mainly in section on irregular line $x^1$—$x^1$, Fig. 2, of a portable water heater or steam pot constructed in accordance with this invention, and in use.

Fig. 2 is a sectional plan view, on an enlarged scale, taken on line $x^2$, Fig. 1, with the container for the supply body of water, fragmentally shown.

Fig. 3 is a fragmental perspective view of the portable heater, shown partly in vertical section on irregular line indicated at $x^1$, Fig. 2 and partly in horizontal section on the plane indicated by line $x^3$, Fig. 1; an intermediate portion of the shell is also broken out for clearness of illustration.

Fig. 4 illustrates the invention as applied more particularly as means to heat water flowing from a service pipe to any place of intermittent use.

Fig. 5 is an enlarged sectional detail on line $x^5$, Fig. 4, illustrating a form of diaphragm-operated electrical switch for turning the current on and off as the water is turned on and off.

Fig. 6 is a section analogous to Fig. 5, showing the position of parts when the water is turned off.

In Figs. 1 and 4 the water is indicated in broken lines, and in Fig. 1 the steam is indicated by arrows.

Referring first to the steam pot shown in Figs. 1, 2 and 3.

1 is a water supply means which is shown as a container constructed of sheet metal and comprising a body 2, a bottom 3 and a top 4 that is provided with an opening 5 into which is inserted an open bottom heat stack comprising an outer shell 6 shown as constructed of sheet metal and provided with an annular closed heat insulating buoyant chamber 7, adapted to be spaced as at 8 from the bottom 3 of the container to allow water to flow from the main body of the container into the upwardly open water heating and steam generating space 9.

The upper end of the shell is formed of a head 10 that is shown threaded at 11 onto the outer wall 6. A portion 12 of the shell is shown extending above the container to form a steam dome, and is adapted for steam delivery, as by a constantly open nozzle or spout 13.

Inside the shell and spaced therefrom there is a heating drum, the outer wall 14 of which is sinuous and constitutes the outside wall of a closed central water-tight heat-radiating chamber that is shown as a substantially cylindrical vertically longitudinally and radially slotted sheet metal drum 15 having heads 16 and 17, that are radially slitted to form the inlets and outlets for vertical slots, 22, and being of a slightly less diameter than the water space 9 inside the annular heat insulating air chamber 7 of the shell.

Inside the drum 15, and insulated therefrom, there is mounted an electrical heating unit 18 comprising an insulating core 19 and a resistance coil 20 connected through wires 21, 21', with a source of electrical energy not shown.

The sinuous water heating wall 14 is formed at circumferentially spaced intervals with folds practically forming the vertical slot-like spaces 22 between parallel walls 23, and open throughout and at their tops to constitute portions of the water heating space 9, open to the container 1 at the bottom, and to the steam dome 12 at the top. The heads 16 and 17 are welded, brazed or otherwise joined at the margins of their slits 24 to the sinuous ends of the heater wall; that is to say, to the drum perimeter and edges of the folds.

The lower head 16 is shown as entirely closing the lower end of the radiating space 25 inside the sinuous wall; and the upper end of said space is shown closed by a cap 26 brazed or welded onto the head 17 to close the top of the radiating chamber; and said cap is connected to a tube 27 that extends through the wall of the dome and forms a conduit for the electrical conductor 21, 21'.

It is understood with respect to the steam pot, that any form of water supplying vessel may be used in connection with the drum, it only being necessary that it be adapted to accommodate the generator and afford a sufficient depth of water to properly fill the portion of the stack inserted thereinto. Said stack is shown constructed to afford sufficient buoyancy to float it as indicated in Fig. 1.

In practical use, with the portable form, the stack with heat unit inside, will be put into a vessel containing the water supply, and the electricity will then be turned on to heat the resistance which at once radiates heat through the radiating chamber to heat the sinuous wall enclosing such chamber; and owing to the thinness of the annular body and inwardly extending limbs of the water body contacting with the sinuous wall, an extended sinuous sheet of steam is produced next to the sinuous wall, and flows freely up such wall and to the steam dome from which it is discharged continuously through the constantly open spout or nozzle 13.

In assembling the parts the drum cap 26 and tube 27 will be inserted into the shell, and the cord of the conductor wires 21, 21' connected to the resistance will be passed through a hole therefor in the dome and appropriately connected to the terminals of the resistance; then such resistance will be inserted into the space inside the stack of channels or flues 22 and the outer end of the tube will be fitted in said hole in the wall of the dome 12, and will be brazed on or otherwise joined to the dome, and the cap 26 will be welded or brazed to the inner margin of the upper head 17, thus enclosing the resistance in a radiating chamber inside the drum, and insuring it against admission of water or steam from the space within the shell.

It is thus seen that the drum with its heat unit inside constitutes a heat element inside the shell and that the same may be surrounded by liquid entering from below, and that since the dome is open to the air at its upper part as through the spout 13, when the shell with the heat element inside, is inserted into the body of liquid, the water space between the shell and drum will be filled with liquid up to the level of the body of liquid in the container 2, and that as heat is applied inside the radiating chamber of the drum, steam will be produced against the walls of the drum and will more and more fill the space between the drum and shell, from bottom to top of such space, and will be more and more heated as the upper part of the drum is approached, until the steam escapes into the open air.

It is understood that the heat unit may radiate sufficient heat to transform the water into steam at the lower portions of the water space inside the shell before the liquid can reach the submergence height in such space; and the steam may thus be brought to a very high temperature, and without any danger of explosion, since there is a continuous escape of steam at the nozzle, thus preventing accumulation of high pressure.

28 indicates flanges at the ends of the insulating core 19, to insulate and space the resistance from the inner bends of the folds of the sinuous wall.

The spout 13 is shown aslant so that any water condensed in the nozzle from steam that may arise from the water in the drum that may pass to the nozzle while the heater is cooling after the electricity is turned off, will be returned to the steam dome and the water space therebelow.

In practical manufacture the various parts inside the shell will be suitably joined water and steam tight as by welding or brazing.

The sinuous wall of the drum is made by crimping a strip of sheet metal into folds spaced apart substantially as indicated in the several views, and then bending the strip into substantially cylindrical form and joining and fastening together the ends of the strip as by lap or butt welding or brazing, thus to form the channelled wall of the drum.

Then the slitted head 16 is joined to the lower end of the wall, to close the lower end of the space inside the inner face of the sinuous wall, and the slitted head 17 is likewise fastened to the top end of the sinuous wall; leaving open the ends of the channels, between the adjacent walls of the folds.

A wall 29, having heads 30 and 31, is secured to the wall 6 of the shell and forms therewith a dead-air space for heat insulating the water content of the boiler from the body of water to be converted.

Means, such as the filling opening 32 and cap 33 are provided for supplying water to the container 1.

In the form illustrated in Figs. 4, 5 and 6 the water is supplied under pressure through a pipe $a$ and the discharging pipe 13' is open to the atmosphere through a valve 34; and while the valve is open, the electric current flows freely to the resistance through the leads 21, 21' and their movable contact points 35, 36 are covered by the resilient diaphragm 37, one side of which is open to the portion 38 of the conduit 13' that leads to the valved outlet 34 that is shown as a faucet adapted to be opened to draw water from the shell.

Contact points 40 and 41 are arranged stationary to the conduit in position to be contacted by the movable contact points 35, 36, respectively, to open the circuit for the resistance to heat the liquid flowing through the channels in the drum. When the valve is closed, the water pressure acting on the diaphragm and the contact points, are moved outward and the circuit is broken so that the water is heated and electricity is used only while the faucet is open.

It is noted that in each form of the device the water inlet is below, and the outlet above an intermediate level wherein the resistance is located, and that although the pressures under which the water is delivered to the bottom of the shell is indicated as less in the one instance than in the other, the principle involved is the same in each, that quick heating and immediate escape of the heated product is effected so long as the water is supplied and the outlet is open; and in each device the electric current is controlled by an attendant, who, in the one instance, will directly operate an electric switch, not shown, and in the other instance simply operates the faucet valve.

It is understood that part or practically all of the apparatus may be made of castings instead of the sheet metal, and I do not limit the construction in such respects.

I claim:—

1. A liquid heater comprising a shell having an inlet below, and an outlet above an intermediate plane; means to supply liquid to the inlet; a drum arranged inside and narrowly spaced from the walls of the shell to form therewith an outer direct passageway for fluid, and having a sinuous way formed with straight longitudinal folds constituting narrow direct channels open at the top and bottom and also at the periphery of the drum to communicate with the outer passageway and heads closing the ends of the drum and the sinuous walls; said folds being arranged in parallelism to form inside said sinuous wall, a chamber adjacent to and enclosed by said heads and the walls of said channels and passageway; and a heating element in the chamber.

2. A liquid heater comprising a shell having an inlet below, and an outlet above an intermediate level; means to supply liquid to the inlet; a drum arranged inside and narrowly spaced from the walls of the shell to form an outer passageway for fluid, and formed with folds constituting narrow channels open at top and bottom and open at the periphery of the drum to communicate with the outer passageway; said folds being arranged to form the outer wall of a chamber adjacent to and enclosed by the walls of said channels and passageway; heads to close said chamber; an electrical heating element in the chamber, and switch controlled means to supply current to such element.

3. A liquid heater comprising a shell having an inlet, below, and an outlet above; means to supply liquid under pressure to the inlet; a drum arranged inside and narrowly spaced from the walls of the shell to form an outer passageway for fluid, and formed with folds longitudinal constituting narrow channels open at the ends, and at the periphery of the drum to communicate with the outer passageway; heads in combination with said folds being arranged to form a chamber adjacent to and enclosed by the walls of said channels and passageway; an electrical heating element in the chamber; and water pressure operated switch means adapted to supply current to such element when the water pressure is lowered, and to cut off such current when the water pressure is restored.

4. In a liquid heater, a drum comprising a sheet metal wall having folds forming a passageway open at its ends and surrounding a central chamber; heads fixed to said wall to complete the chamber, a shell open at both ends surrounding the chamber and spaced therefrom, means to supply liquid to the lower open end of the shell; a heating element in the chamber; and means to discharge the heated products at the upper end of the shell.

5. A steam generator comprising a shell, having a steam dome; and spaced from a drum inside the shell and having, outside its chamber, channels open at bottom and top and open to the space between the drum and shell; means to supply liquid to the bottoms of the shell; means to discharge fluid from the top of the shell, and a heating element in the drum.

6. A liquid heater comprising a shell having an inlet at the lower end and an outlet at the upper end; means to supply liquid to the lower end; a drum arranged in the shell and narrowly spaced from the wall of the shell to form a main outer channels for fluid to pass up around the drum; the walls of said drum being constructed with inward bends forming narrow inner channels open at bottom and top and communicating with the upper end of the shell; electrical heating means in the drum; a tube arranged in the shell and open to the inside of the drum and to outside the shell; electrical resistance in the drum and electrical conductors connected to the resistance, and extending through the shell for connection with an electrical source.

7. The heating drum substantially set forth for use in a liquid heater and comprising a hollow crimped sheet metal wall, the crimps forming parallel open ended ways; and heads for such wall, said heads being recessed and fixed to the ends of the walls, the recesses being open to the ways; and a shell around the drum and spaced therefrom to form a narrow passage way between the drum and the shell, there being within the crimped walls of the drum a closed chamber adapted to contain a heating element.

8. A steam pot comprising a container for a body of water; a shell open at the ends and adapted to be inserted into a body of water in the container; a heating drum in said shell; a heat unit in said drum and a nozzle for said shell to direct steam therefrom for the purposes stated.

9. A steam pot comprising a shell for insertion into a body of water; means for externally heat-insulating a portion of the shell; a hollow closed drum for arrangement in the heat insulated portion of the shell; an electric heat unit for disposal within the drum, and a steam delivering spout in communication with the shell.

10. In a steam pot for the purposes stated, a container for a body of water; means forming an open ended water way and heat space within the container; means for heat-insulating the water way and heat space from water in the container; a closed hollow drum occupying a portion of the heat space; there being recesses in the periphery of the drum to provide increased surface exposure to the heat and water spaces; an electric heat unit within the drum, and a steam delivering nozzle leading from the water way.

11. In a device of the class described, a shell; means forming a dead-air space in a portion of the shell; a closed cylindrical sheet metal drum within the shell and having radially disposed channels in the periphery of the drum; and an electric heating unit within said drum.

12. A heating drum closed at the ends and constructed as a unit of sheet metal and comprising devices forming narrow externally vertical straight channels for exposure to a volume of water to be heated, and relatively great areas for exposure to a source of heat.

13. A closed heating drum constructed as a unit of sheet metal and having folds in its periphery to form radially wide and peripherally narrow water channels at the exterior of the drum and to form relatively great areas surrounding the water spaces for exposure at the interior of the drum.

In testimony whereof, I have hereunto set my hand at Los Angeles, California, this 24th day of December, 1927.

ARVID BRODIN.